July 10, 1962 K. R. ÅSTRÖM 3,043,375
REMOVABLE HOISTING ATTACHMENT FOR TRACTORS
Filed May 1, 1959 3 Sheets-Sheet 2

Karl Ragner Åstrom
Inventor
Attorney

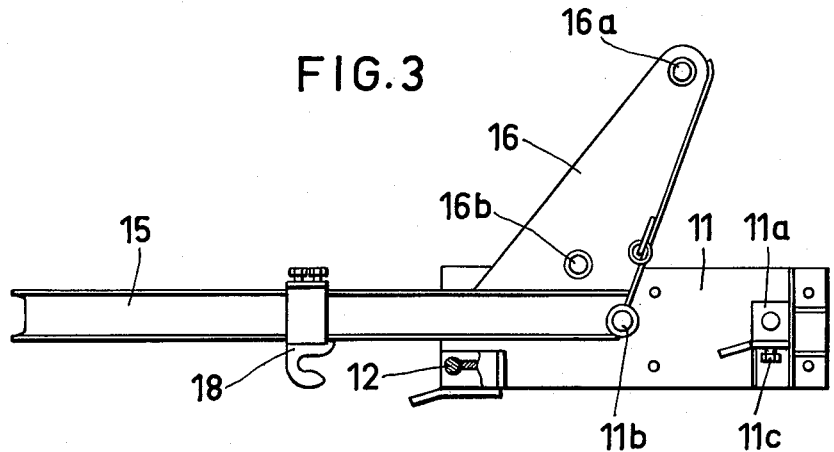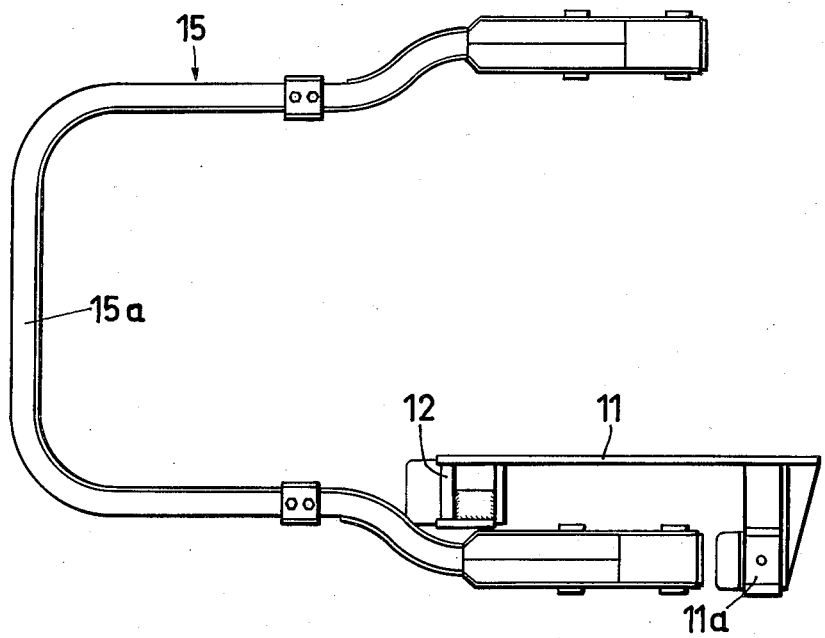

United States Patent Office 3,043,375
Patented July 10, 1962

3,043,375
REMOVABLE HOISTING ATTACHMENT FOR TRACTORS
Karl Ragnar Åström, Brännland, Sweden
Filed May 1, 1959, Ser. No. 810,389
Claims priority, application Sweden May 9, 1958
1 Claim. (Cl. 172—273)

The invention relates to tractors having a hoisting boom mounted in front of the tractor and adapted to be raised and lowered hydraulically, which hoistening boom, after lowering so that an implement attached to the boom rests on the ground, and after placing a ground support under the rear portion of the hoisting boom, can be dismounted by backing away the tractor after securing means have been detached and the conduits to the hydraulic cylinders of the hoisting boom have been disconnected.

Devices of this kind are known in the art and facilitate to a great extent the mounting and dismounting of the hoisting boom. For example, when the tractor is to be used for traction, the driver can, with rather simple manipulations, detach the hoisting boom which constitutes an inutile load on the front wheels and disadvantageously influences the tractive effort of the tractor because the drive wheels become less loaded, and moreover it restricts the free field of vision for the tractor driver. When the hoisting boom is to be used, the tractor is driven up to the same whereafter the required couplings are made.

The object of the invention is to provide a very advantageous construction of the attachment means of the hoisting boom, said attachment means being designed in such a manner that the hydraulic cylinders of the hoisting boom may be utilized for facilitating the mounting and dismounting of the hoisting boom. According to the invention the hoisting boom is, in a vertical plane, pivotally attached to a U-shaped frame surrounding the front end of the tractor in a horizontal plane, the rear end of said frame being detachably secured to the tractor, the frame being further provided with open-ended hinge means adapted to engage pivot bolts or the like secured to the tractor.

This U-shaped frame can be made very stiff and unyielding and can easily be connected to appropriate brackets and pivot bolts of the tractor. Furthermore, the U-shaped frame can be easily fitted to most tractors irrespectively of whether the tractors have narrow-gauge or wide-gauge front wheel undercarriage, the frame being located well above the front wheels. However, the principal advantage of this structure is deemed to be that the hydraulic rams of the hoisting boom may be used for mounting and dismounting the latter. These advantages will be more evident from the following description and the attached drawings.

FIG. 3 is a side elevation on a larger scale of the U-shaped loader frame and the corresponding mounting means on the tractor;

FIG. 4 is a top plan view of the structure illustrated in FIG. 3; and

Figure 1:
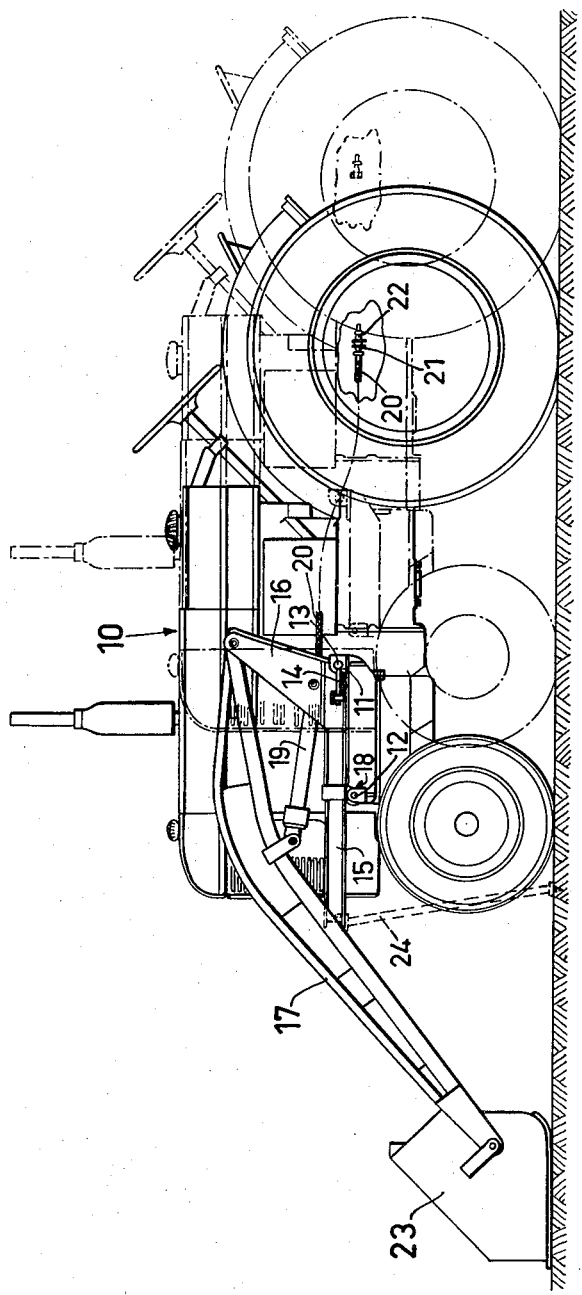
FIG. 1 is an elevational view of the loader attached to a tractor with its loader bucket resting on the ground.
Figure 2:
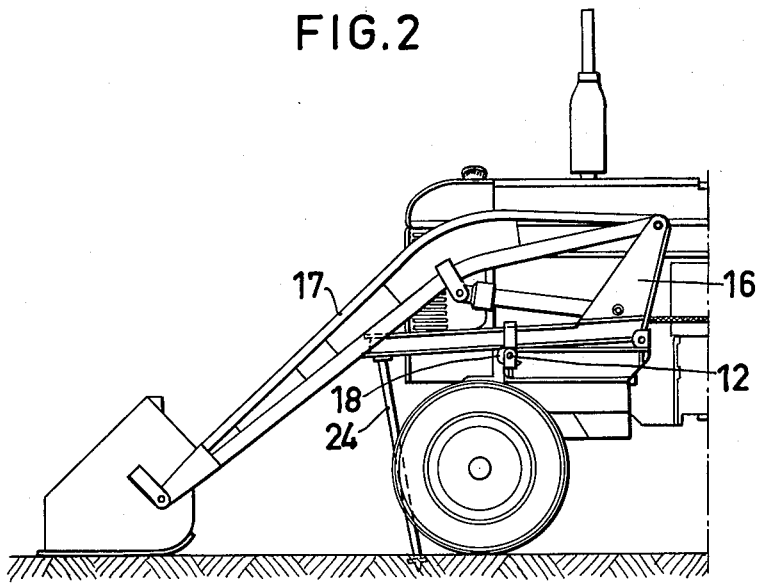
FIG. 2 is a similar elevational view with a ground support mounted below the front portion of the loader frame, and with the loader tilted at a small angle to lower its front portion and to raise its rear portion prior to detaching it from the tractor.

The reference numeral 10 denotes a tractor on both sides of which there are permanently fixed brackets 11, e.g. secured to the frame of the tractor. The brackets 11 are each provided with a hole 11a (FIG. 3) and corresponding holes 11b formed near the rear end of the shanks of a U-shaped frame 15 may be made to register with the bracket holes 11a, so that bolts 13 (FIG. 1) with handles 20 may be inserted in the holes to connect the rear end of the frame 15 to the tractor. The frame 15 preferably consists of a beam bent into U-shape, the middle portion 15a of which (FIG. 4) is situated in front of the radiator of the tractor when the frame is mounted on the tractor, as shown in FIGS. 1 and 2. At their middle portion both frame shanks are, at the underside, provided each with a hinge member 18, open at the rear end. When the frame is mounted, said hinge members engage pivot bolts 12 secured to the brackets 11, FIGURES 3 and 4. Thus, when the frame 15 is mounted on the tractor with the bolts 13 inserted through the holes 11b, 11a in the frame 15 and the brackets 11, respectively, and with the hinge members 18 engaging the pivot bolts 12, it is firmly held in the horizontal position shown in FIG. 1 of the drawing. However, if the bolts 13 are removed, the frame can be rocked counterclockwise on the pivots 12, and can be pulled away forwardly from the tractor.

At each rear shank end of the frame 15 there is fixedly secured an upright 16, and between the upper ends of said uprights there is pivotally mounted in bearings 16a (FIG. 3) a hoisting boom 17 adapted to be raised and lowered hydraulically. Hydraulic rams 19, with pistons for raising and lowering the hoisting boom are connected as as shown between the bearings 16b and the boom 17. Through hoses 20 terminated by couplings 21, which are detachably connected with corresponding couplings 22 on hoses (not shown) the ends of the rams 19 communicate with a hydraulic system of the tractor which may be of known, suitable design. The couplings 21, 22 are in a known manner designed in such a way that oil leakage is prevented at the disconnection of the hoses. The hoisting boom 17 carries at its free end an implement, e.g. a bucket 23. The required control means for the implement may be of suitable known construction and have not been shown in the drawing.

Figure 5:
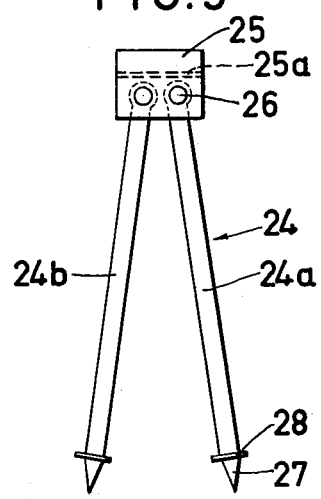
FIG. 5 is an elevational front view of a ground support.

At the front transverse portion 15a of the frame 15 there is, or may be provided a support 24 (FIG. 5), preferably in the form of an inverted V, the legs or shanks 24a and 24b of which serve as a ground support and preferably may be adjustable in various relative angular positions by being pivoted as at 26 to a top cross member 25 with a channel-shaped top portion having a bottom 25a which engages the bottom face of the frame 15. The legs 24a and 24b are preferably provided with pointed bottom end portions 27 and widened collar portions 28 above the latter, to reduce the penetration into the ground.

If the hoisting arm 17 is to be dismounted, the tractor driver first either places the support 24 under the frame 15, as shown, or folds down the permanently mounted legs of the support so that they contact the ground. Thereafter he lowers the hoisting boom 17 so that the implement 23 will rest on the ground. Then he removes the bolts 13 so that the rear end of the frame 15 is released from the brackets 11 on the tractor.

Now the driver actuates the hydraulic system in such a manner that the ram pistons are moved outwards for some distance. Since the assembly comprising the hoisting boom 17 with the implement 23 and the frame 15 is front-heavy, the implement is not raised, but the frame 15 will rock counterclockwise (FIG. 2) on the pivots 12, and the support legs are pressed firmly into the ground, The hoisting boom now firmly rests on the implement 23 and the support 24, and the rear end of the frame 15 has been raised as illustrated in FIG. 2. After the couplings 21 and 22 have been disconnected, the tractor can now easily be backed away from the hoisting boom because the pressure upon the pivots 12 from the open-ended hinges 18, has greatly been relieved by the support 24. The assembly comprising the frame 15, the hoisting boom 17 and the implement 23 will stand firmly until needed next time.

When mounting the hoisting apparatus the operations will be reversed. The tractor is driven in the forward direction until the pivots 12 enter the hinges 18 which for this purpose are preferably shaped with a widened mouth portion, so as to facilitate the engagement of the pivots. If the support legs may have sunk somewhat lower into the ground in the meantime, that is easily compensated for by extending the rams 19 some small extra distance after the couplings 21, 22 have been connected, to make the apparatus tilt a small angle counterclockwise on the ground support 24 before the hinges 18 are made to engage the pivots 12. When the pivots have been brought fully home into the hinges the tractor is stopped.

The hydraulic system is now operated in such a manner that the rams 19 are contracted and consequently the rear end of the frame 15 is lowered so that the holes 11a in the brackets 11 become aligned with the holes 11b in the rear ends of the frame. There are preferably provided abutments 11c (FIG. 3) which stop the clockwise movement of the frame 15 when the holes are aligned. The bolts 13 are inserted and the support 24 is removed or retracted.

If the hoisting boom 17 is to be dismounted or mounted without being provided with an implement, the weight of the latter may be replaced by a load or by a device retaining the front end of the hoisting boom on the ground since it is a condition for the correct operation of the device that the hoisting boom shall be heavy at the front.

The hinges 18 may be provided on the tractor and the pivots 12 on the frame 15, instead. In that case the hinges must, of course, be open at the fore end.

Due to the easy mounting and dismounting of the hoisting boom the latter will not limit the versatility of the tractor. Mounting or dismounting can be effected by the tractor driver alone in less time than two minutes.

Due to the fact that the attaching means on the tractor are so very simple, one and the same hoisting boom may, if desired, be used for several tractors. Thus, the break-down of a tractor need not mean that its hoisting apparatus must remain idle during a corresponding time.

What I claim is:

In combination, a tractor, respective brackets mounted on the opposite sides of the forward portion of the tractor, each bracket being provided at its rear portion with an aperture and at its forward portion with an outwardly projecting pivot bolt, a U-shaped frame member closely straddling the forward portion of the tractor, the side arms of said U-shaped frame member extending adjacent said brackets, each side arm being provided with an end aperture registrable with one of said first-named apertures and adapted to receive a bolt passing through said one of the first-named apertures, and with a rearwardly opening hook-shaped hinge member receiving a first-named outwardly projecting pivot bolt, each side arm being provided at its free end with an upstanding upright, a pair of vertically spaced bearings in each upright, a boom having an implement at its forward end, means pivotally connecting said boom to the uppermost bearings, hydraulic ram means connected between the lower bearings and the intermediate portion of the boom, said ram means having outwardly movable piston elements tending to elevate the boom when extended, and whereby the weight of the boom and implement will act to rotate the forward portion of the frame member downwardly when the second-named bolts are removed, and a supporting leg provided with a transverse channeled top portion receiving the forward portion of the frame member and with a pointed bottom end engageable in the ground beneath said frame member, said pointed bottom end being driven into the ground when the forward portion of the frame member is rotated downwardly by the weight of the boom and implement, allowing the boom and implement to be supported solely on said frame member and supporting leg and allowing the tractor to be freely moved rearwardly to disengage said first-named outwardly projecting pivot bolts from said hook-shaped hinge members.

References Cited in the file of this patent
UNITED STATES PATENTS

| | | |
|---|---|---|
| 2,701,072 | Chambers | Feb. 1, 1955 |
| 2,738,083 | Cadwell | Mar. 13, 1956 |
| 2,745,564 | Billerstein | May 15, 1956 |
| 2,833,432 | Foster | May 6, 1958 |